(12) United States Patent
Khade et al.

(10) Patent No.: US 10,558,574 B2
(45) Date of Patent: Feb. 11, 2020

(54) REDUCING CACHE LINE COLLISIONS

(71) Applicant: Intel Corporation, Santa Clara, CA (US)

(72) Inventors: Abhishek Khade, Chandler, AZ (US); Patrick Lu, Chandler, AZ (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/992,557

(22) Filed: May 30, 2018

(65) Prior Publication Data

US 2019/0042432 A1 Feb. 7, 2019

(51) Int. Cl.
*G06F 12/08* (2016.01)
*G06F 12/0846* (2016.01)

(52) U.S. Cl.
CPC .. *G06F 12/0846* (2013.01); *G06F 2212/1016* (2013.01)

(58) Field of Classification Search
None
See application file for complete search history.

(56) References Cited

U.S. PATENT DOCUMENTS

2001/0003206 A1 6/2001 Pole et al.
2006/0053326 A1 3/2006 Naveh et al.
2011/0153924 A1 6/2011 Vash et al.

FOREIGN PATENT DOCUMENTS

EP 2804076 A2 11/2014

*Primary Examiner* — Kevin Verbrugge
(74) *Attorney, Agent, or Firm* — Patent Capital Group

(57) ABSTRACT

There is disclosed in one example a computing apparatus, including: a cache; a caching agent (CA); an integrated input/output (IIO) block to provide a cache coherent interface to a peripheral device at a first speed; a core configured to poll an address within the cache via the CA, wherein the address is to receive incoming data from the peripheral device via the IIO, and wherein the core is capable of polling the address at a second speed substantially greater than the first speed; and a hardware uncore agent configured to: identify a collision between the core and the IIO including determining that the core is polling the address at a rate that is determined to interfere with access to the address by the IIO; and throttle the core's access to the address.

25 Claims, 10 Drawing Sheets

REDUCING CACHE LINE COLLISIONS

FIELD OF THE SPECIFICATION

This disclosure relates in general to the field of data center computing, and more particularly, though not exclusively, to a system and method for reducing cache line contention.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
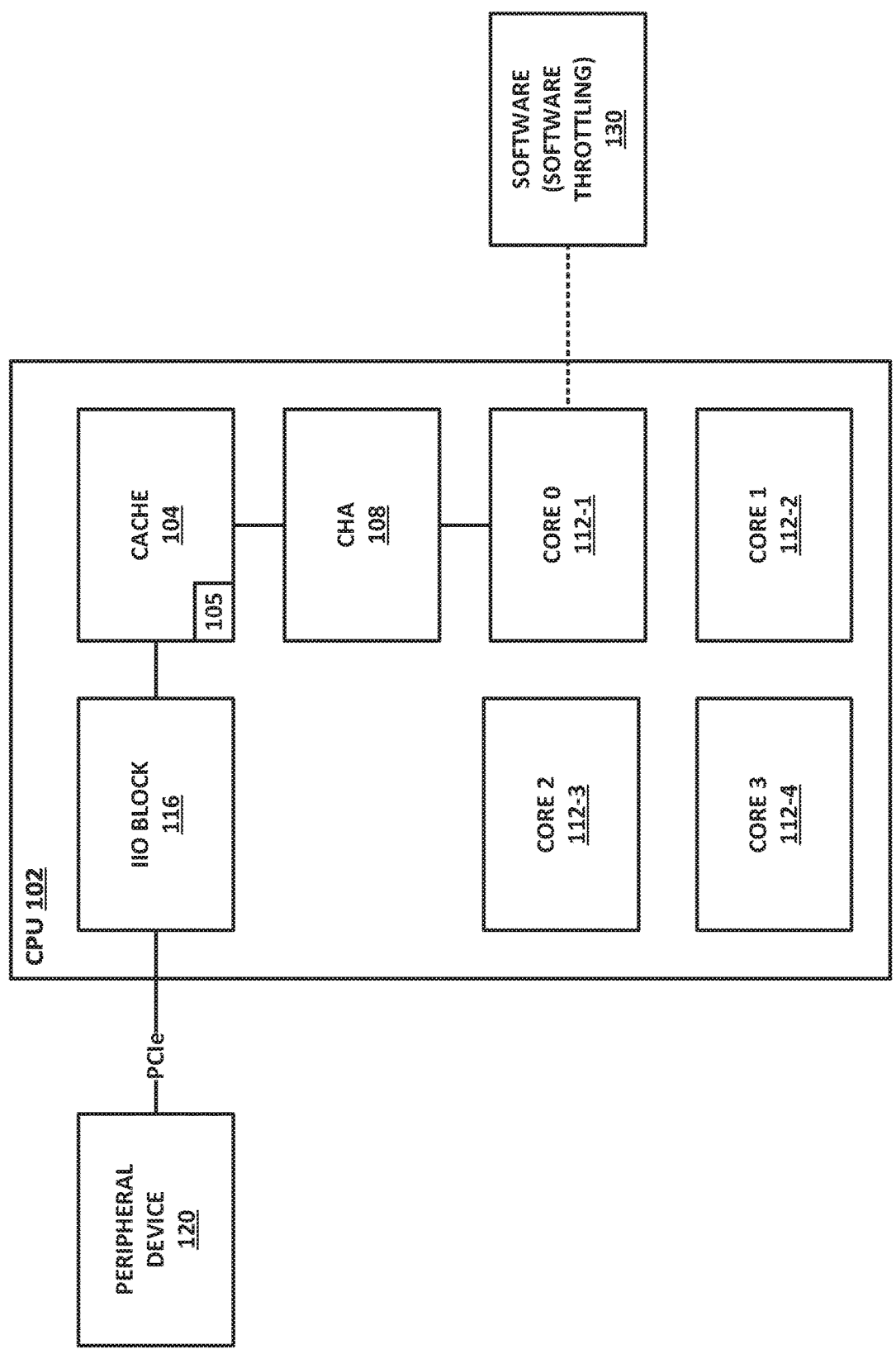
FIG. 1 is a block diagram of a computing system that uses software throttling to reduce cache line contention, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources.

In embodiments of the present specification, a processor includes any programmable logic device with an instruction set. Processors may be real or virtualized, local or remote, or in any other configuration. A processor may include, by way of nonlimiting example, an Intel® processor (e.g., Xeon®, Core™, Pentium®, Atom®, Celeron®, x86, or others). A processor may also include competing processors, such as AMD (e.g., Kx-series x86 workalikes, or Athlon, Opteron, or Epyc-series Xeon workalikes), ARM processors, or IBM PowerPC and Power ISA processors, to name just a few.

As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer.

As used in the present specification, by way of nonlimiting example, a VM is an isolated partition within a computing device that allows usage of an operating system and other applications, independent of other programs on the device in which it is contained. VMs, containers, and similar may be generically referred to as "guest" systems.

Containerization is a method of providing system resources, wherein instances of network functions are provided in "containers" that are separated from one another, but that share underlying operating system, memory, and driver resources.

In contemporary computing practice, central processing unit (CPU) speeds have become very fast and individual machines have become very capable. However, as large-scale workloads increase, many operations are being moved to data centers and/or to high performance computing (HPC) clusters. As the computing paradigm moves from a single standalone machine operating on a single workload to highly distributed computing, optimizing communication efficiency becomes a premium concern.

One technique for optimizing communication workloads, for example in the context of high-volume commodity servers, is the use of user space polling to avoid the latency of interrupt service routines. Latency may be experienced by the kernel space to user space context switch that is required by interrupt mechanisms. By eliminating this context switch, polling based services may achieve lower latency, determinism, and high throughput.

Many types of input/output (I/O) peripheral devices are adopted to such polling models, such as field-programmable gate arrays (FPGAs) used in aerospace systems, smart network interface cards (NICs), general purpose graphics processing units (GPGPUs), storage devices, and network security devices, by way of nonlimiting example. Certain telecommunications applications, firewalls, network function virtualizations (NFVs), security gateways, and others are commercial solutions adopted to the polling regimen. Furthermore, the 5G enhanced packet core (EPC) introduces a polling mechanism as a proposed solution to achieve scalability and low latency.

As used in embodiments of the present specification, cache coherency is a memory architecture that provides uniform sharing and mapping between a plurality of caches. For example, the caches may map to the same address space. If two different caches have cached the same address in the shared address space, a coherency agent provides logic (hardware and/or software) to ensure the compatibility and uniformity of shared resource. For example, if two caches have cached the same address, when the value stored in that address is updated in one cache, the coherency agent ensures that the change is propagated to the other cache. Coherency may be maintained, for example, via "snooping," wherein each cache monitors the address lines of each other cache, and detects updates. Cache coherency may also be maintained via a directory-based system, in which shared data are placed in a shared directory that maintains coherency. Some distributed shared memory architectures may also provide coherency, for example by emulating the foregoing mechanisms.

Coherency may be either "snoopy" or directory-based. In snoopy protocols, coherency may be maintained via write-invalidate, wherein a first cache that snoops a write to the same address in a second cache invalidates its own copy. This forces a read from memory if a program tries to read the value from the first cache. Alternatively, in write-update, a first cache snoops a write to a second cache, and a cache controller (which may include a coherency agent) copies the data out and updates the copy in the first cache.

By way of nonlimiting example, current cache coherency models include MSI (modified, shared, invalid), MESI (modified, exclusive, shared, invalid), MOSI (modified, owned, shared, invalid), MOESI (modified, owned, exclusive, shared, invalid), MERSI (modified, exclusive, read-only or recent, shared, invalid), MESIF (modified, exclusive, shared, invalid, forward), write-once, Synapse, Berkeley, Firefly, and Dragon protocols. Furthermore, ARM processors may use advanced microcontroller bus architecture (AMBA), including AMBA 4 ACE, to provide cache coherency in systems-on-a-chip (SoCs) or elsewhere.

In some computing systems, a CPU may include an integrated input/output (IIO) block that provides a cache coherent interface to a peripheral device. Specifically, the peripheral device may communicatively couple to the CPU via an interface such as peripheral component interconnect express (PCIe), which may not itself be cache coherent. Thus, the IIO block acts as an intermediary cache coherent agent between one or more cores of the CPU and the peripheral device. Because the cores have DMA access to the cache, they do not need to access the cache via the IIO block, but rather may interact with the cache via a cache home agent (CHA). As disclosed in embodiments of the present disclosure, a CHA includes hardware and/or software that acts on behalf of a user within a computer cache memory architecture.

Thus, when a peripheral device has incoming data, it may interact with the IIO block via the PCIe bus, and the IIO block then writes data to a designated block within the cache. In the meantime, a core of the CPU may be dedicated to polling this dedicated address, watching for incoming data from the peripheral device.

However, the CPU and the IIO may operate at very different frequencies, with the cores often running at much higher speeds. One common usage model is for an I/O peripheral device to enter data into the system via direct memory access (DMA), and for the CPU to consume the data. While CPU polling is a common and effective practice for the low latency, high throughput model, difficulties may arise when the IIO acts as a producer at lower speed and the CPU acts as a consumer at a much higher speed. This can create conflicts on the cache line. In effect, a core operating at 2.5 GHz may effectively monopolize a cache line as compared to a peripheral device operating at between 600 and 800 MHz. Because the high-speed core is constantly locking the cache line so that it can read the cache line and check for available data, the peripheral device, operating via the IIO block, may have limited opportunities to actually write data to that cache line.

This can create undesirable behavior because of the conflict, which can drive many retries from the peripheral device as it attempts to write to the cache line via the IIO block. Thus, the high speed of the CPU actually becomes a bottleneck, as the I/O is constantly experiencing "snoops" from the CPU. Snooping includes a first cache monitoring the address lines of second one or more caches. The first cache watches for writes, to the second cache, of an address that the first cache is also using. Upon detecting a write, the first cache may use a protocol such as write-invalidate or write-update to maintain coherency.

When the CPU produces more snoops than the I/O can efficiently process, the peripheral device cannot gain ownership of the cache line to complete its write operation. When conflicts occur, the effective I/O throughput is greatly reduced. This can be of particular concern in I/O-centric workloads, where maintaining high I/O performance is a premium concern for achieving overall system-level performance.

Some existing solutions use software functions such as schedule yield, pause, or sleep, or hardware-based mechanisms such as I/O snoop response and delay to slow down CPU polling. Some embodiments of these existing systems suffer limitations, particularly in the case of portability. Because different processors may operate at different speeds, the length of an individual clock cycle varies between these platforms. When a software process "sleeps" for a specified time to slow down the CPU, the length of the delay is directly dependent on the length of a clock cycle. A faster core waits for a shorter period of time, while a slower core waits for a longer period.

Embodiments of the present specification realize advantages by providing novel hardware-based solutions for reducing cache line collisions.

In a first embodiment, when an uncore agent such as an IIO block experiences snoops from the CPU and determines that the CPU snoops are coming at a rate that may cause cache line collisions, the uncore agent may issue a P-state transition signal to the requesting core to slow down the core via hardware mechanisms.

In embodiments of the present specification, a P-state is a package-based performance metric specified according to clock frequency and voltage metrics. A P-state transition is a transition from one P-state to another P-state. Note that core-based "C-states" are also provided, as well as package-based C-states (PC-states). In general, P-states are considered operational states, and seek to optimize CPU and frequency of the core during operation. C-states are considered idle states, and seek to optimize the power consumption of a core that is not executing instructions.

Note that on a multicore system, only one core may be designated for polling the cache line to look for data from the peripheral device. Thus, advantageously, that individual core can be slowed via the P-state, while other cores within the system remain unaffected. Thus, the polling core can be throttled without affecting the performance of other cores in the system.

In a second embodiment, the core is not throttled, but rather a coherency agent (for example, the CHA) may observe the cache line contention between the CPU and the uncore device, and may throttle core requests, such as by altering a credit mechanism to provide the CPU with fewer credits for querying the cache line.

The P-state-based solution above achieves better polling performance as well as optimizing core power savings when the core is completely dedicated for I/O processing. In other words, this core is not sharing CPU cycles with other non-I/O tasks. In an I/O-intensive workload, this may often be the case. Thus, it is practical to throttle this single core to achieve the desired results.

The CHA-based solution described above also achieves optimized polling performance, while keeping the requesting CPU core available for other computing applications. This is particularly useful in cases where a single core is not dedicated to polling the peripheral device data. Note, however, that either of the embodiments mentioned above may be used in any suitable environment, and that they are not intended to be limited to the types of workloads mentioned. A practitioner in the art who implements the teachings of the present specification may choose for various reasons to use one or the other of the described embodiments.

To better understand the architectural solutions illustrated in the present specification, it is useful to provide some architectural definitions. A caching agent (CA) is a coherency agent within a node that processes memory requests from the cores within the same node. In contemporary architectures, cores may use an on-die "super queue" (SQ) caching structure to aid in cache coherency, and to temporarily store interconnect requests that are sent to the CA. For example, the different loads that a core sends to the CA may be stored on the SQ. Home agents (HAs) are the node clusters that are responsible for processing memory requests from caching agents such as the CHA, and may act as a home for part of the memory address space. A single die may have multiple homes, having a distributed address space mapping.

Depending on the address space the requests target, the requests may go to the same node's local memory, or they may go via an Ultra Path Interconnect (UPI, formerly called QPI or KTI) to route requests to other processors within the same coherent domain, or they may go to the processors through a coherent host fabric interface (HFI), which may be outside the coherent domain. All the processors connected through a UPI belong to the same coherent domain. A single system may include a plurality of coherent domains, with all coherent domains connected via the fabric interconnect. For example, HPCs or data centers may include N clusters of servers that communicate with each other using the fabric. Using a fabric such as STL, each coherent domain may expose some address region to other coherent domains.

Memory controllers may act as an interface for physical memories. Memories may work in one of two main modes: flat mode or memory side cache. Flat memories may act as memory storage devices. Memory side cache memories may act as a cache for flat memories that reside in other domains. Memory controllers may provide access to the latter type of memories that implement both cache and memory access logic.

Embodiments of the present specification may involve changes to the architecture. For example, in one embodiment, the caching agent (CA or CHA) may be modified with new logic that is able to detect when a memory line is being "ping-ponged" between an I/O device and a core. To do this, the logic may monitor the memory lines that are being accessed by the I/O devices. Additional details of such tracking are provided in FIG. 5.

A system and method for reducing cache line contention will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a computing system that uses software throttling to reduce cache line contention, according to one or more examples of the present specification. As used in embodiments of the present specification, throttling consists of adjusting a CPU's clock speed down, which results in slower operation and less energy consumption.

In the example of FIG. 1, a CPU 102 interacts with a peripheral device 120 via a PCIe bus. CPU 102 includes a plurality of cores, namely core 0 112-1, core 1 112-2, core 2 112-3, and core 3 112-4. Cores 112 include DMA access to a cache 104, for example via a CHA 108. Software 130 operates on core 112-1.

Within cache 104, a dedicated cache line 105 is provided for receiving data from peripheral device 120 via IIO block 116. When peripheral device 120 provides data via the PCIe bus, IIO block 116 attempts to lock cache line 105 so that it can write to the cache line. However, peripheral device 120 may operate at only approximately 600 to 800 MHz, while cores 112 may operate at 2 to 3 GHz. Thus, as core 0 112-1 continuously snoops cache line 105, IIO block 116 may have difficulty getting a lock on cache line 105.

In this embodiment, software 130 may employ software throttling to reduce the number of accesses to cache line 105, thus giving IIO block 116 the ability to write out data from peripheral device 120 to cache line 105.

However, as discussed above, the use of software throttling has some limitations. Notably, software throttling may be highly dependent on the period of a clock cycle. If a core is faster, it has a shorter clock cycle, while if it is slower, it has a slower clock cycle. Thus, software may need to be modified if there is any change in the speed of core 0 112-1.

Figure 2:
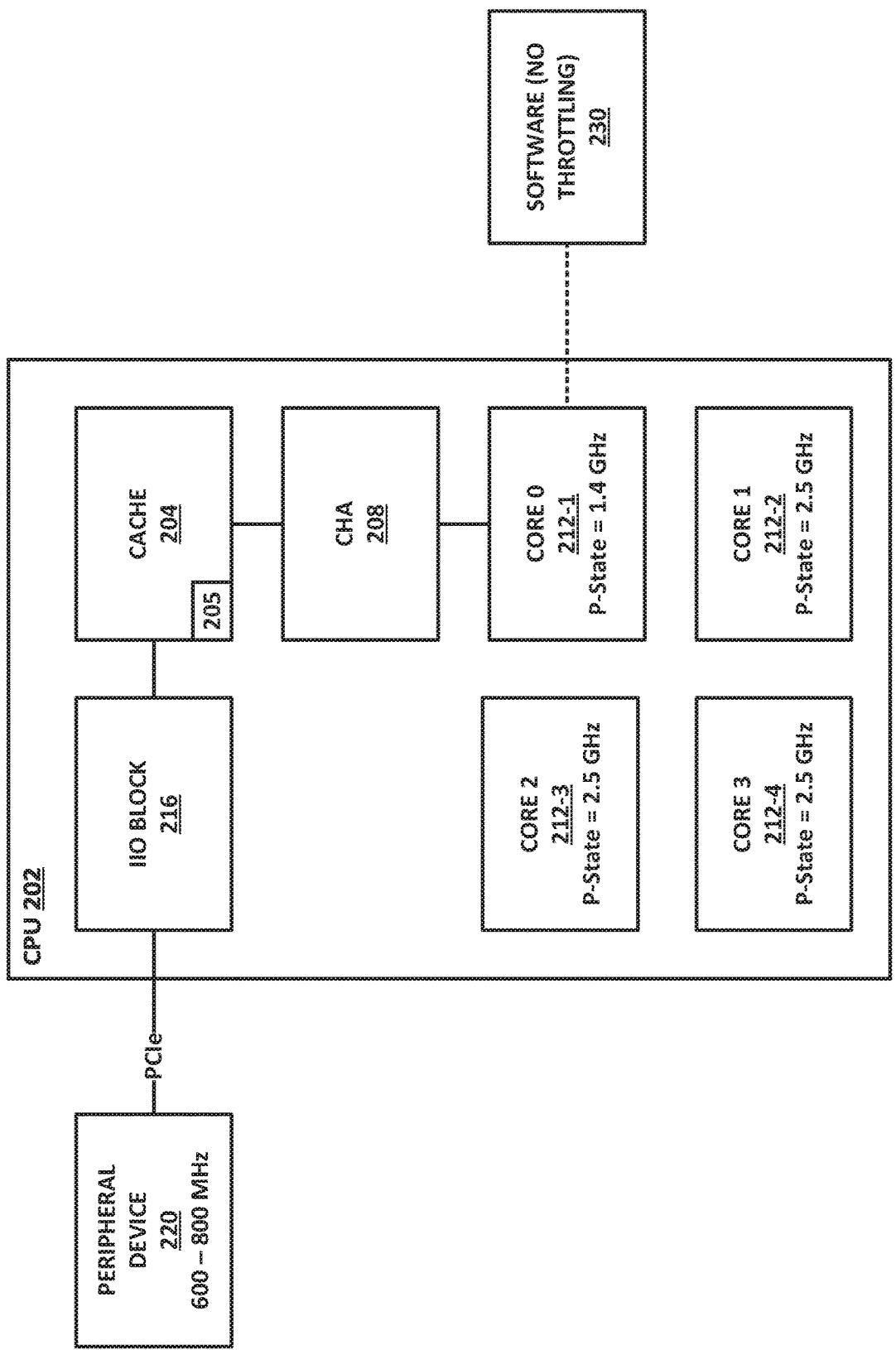
FIG. 2 is a block diagram of a computing system that uses hardware throttling to achieve a reduction of cache line collisions without software throttling, according to one or more examples of the present specification.

FIG. 2 is a block diagram of a computing system that uses hardware throttling to achieve a reduction of cache line collisions without software throttling, according to one or more examples of the present specification.

In the example of FIG. 2, CPU 202 includes core 0 212-1, core 1 212-2, core 2 212-3, and core 3 212-4. Similar to FIG. 1, a core 0 212-1 accesses cache line 205 via CHA 208 within cache 204. Peripheral device 220 communicatively couples to IIO block 216 via a PCIe bus. When IIO block 216 receives data from peripheral device 220, IIO block 216 attempts to gain a lock on cache line 205 within cache 204 and write the data to cache line 205. As before, if core 0 snoops cache line 205 too quickly, then it effectively monopolizes the cache line, making it difficult for IIO block 216 to gain a lock on cache line 205 to write the data.

Similar to FIG. 1, software 230 operates on core 0 212-1. However, software 230 provides no software throttling of the cache line accesses.

Cores 212-1 of CPU 202 may support signals such as a P-state. Natively, cores 212 may operate at a high frequency, such as 2.5 GHz. However, the operating frequency of any core 212 may be able to be altered via a signal such as a P-state instruction.

Advantageously, parts of the uncore may be able to detect excessive attempts to read cache line 205. For example, when IIO block 216 has ownership of the cache line and attempts a write operation, core 0 212-1 or some other cache agent may send a snoop request to the same cache line. When this occurs, a conflict situation arises. These conflict situations may happen particularly in a tie range of memory addresses, and a narrow range of addresses can be predictable via information from drivers.

When an uncore agent such as CHA 208 detects a conflict, it may issue a P-state to slow down core 0 212-1. For example, CHA 208 may issue a P-state to core 0 212-1 to reduce the speed of core 0 212-1 to 1.4 GHz, or to some other value that is at least the speed of the IIO block and less than the normal operating speed of the CPU. Core 0 212-1 still attempts to access cache line 205 more frequently than peripheral device 220 is able to write to it, but the reduction in speed may reduce the incidence of collisions, thus improving performance. This solution is particularly beneficial in cases where core 0 212-1 is wholly dedicated to polling cache 204 for data from peripheral device 220. Because core 0 212-1 is dedicated to its polling function, reducing the operating speed of core 0 212-1 does not affect the operation of other software. Furthermore, reducing the clock speed of core 0 212-1 also achieves power savings.

Figure 3:
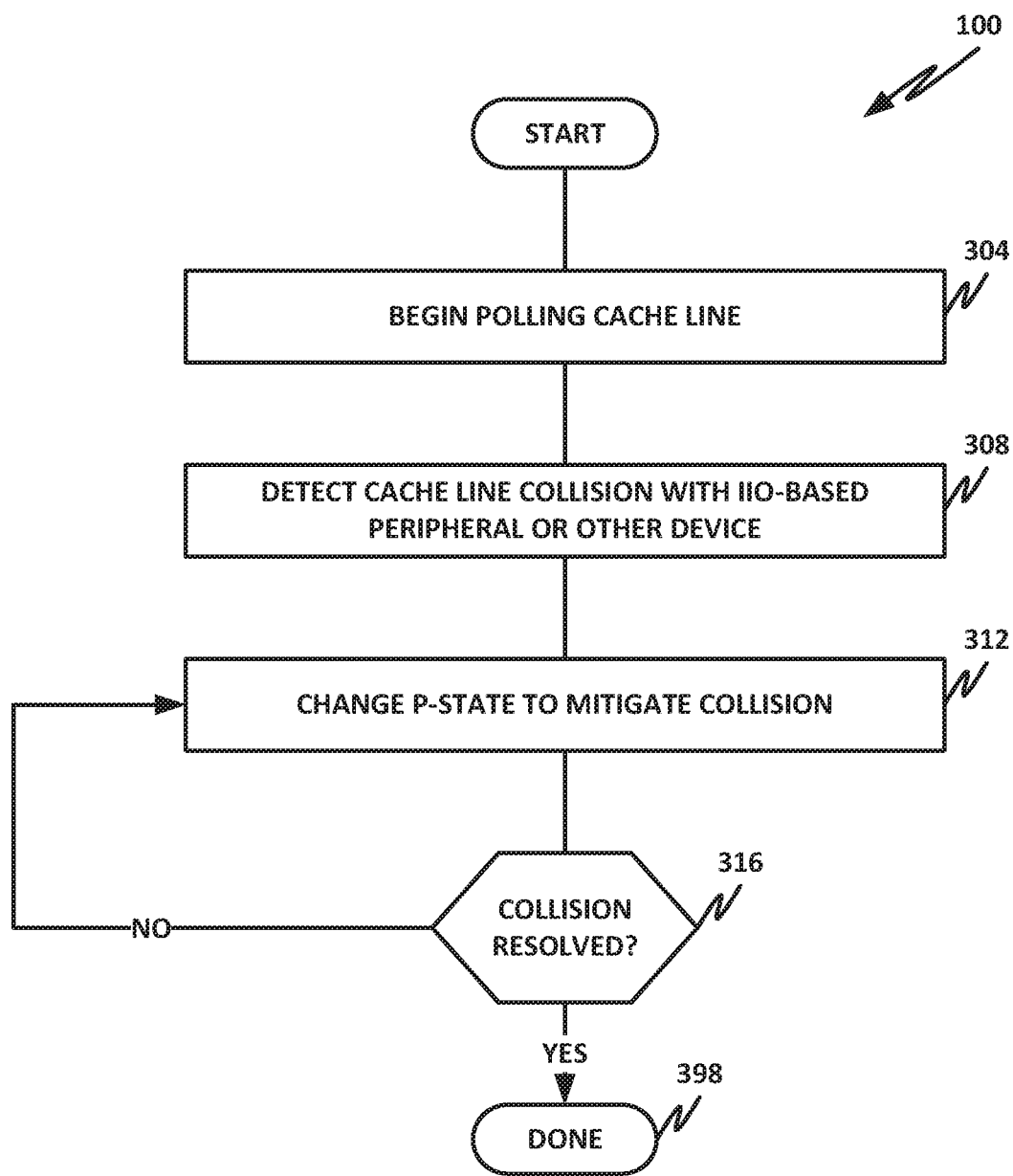
FIG. 3 is a flowchart of a method of operating a system such as the system of FIG. 2, according to one or more examples of the present specification.

FIG. 3 is a flowchart of a method 300 of operating a system such as the system of FIG. 2, according to one or more examples of the present specification.

In method 300 of FIG. 3, beginning at block 304, the core, which may be dedicated to I/O polling, begins polling a particular cache line.

In block 308, an uncore agent, such as the cache or the CHA, may detect a cache line collision with the IIO-based peripheral or other device.

In block 312, the uncore agent may issue a P-state to the core to mitigate the collision. In some embodiments, the uncore agent may issue an aggressive P-state reduction that is presumed to resolve the collision situation. For example, the selected P-state may be configured to ensure that the uncore agent may access the address frequently enough to effectively poll the address without unnecessary latency, while also ensuring that the core's polling of the address does not effectively create a bottleneck for the IIO's access of the address. In other examples, it may be desirable to iteratively reduce the CPU operating frequency to find an optimal balance between CPU operating speed and collision.

Thus, in decision block 316, the uncore agent may watch to determine whether the current change in P-state resolves the collision.

If the collision is not resolved, then control may return to block 312, and a slightly more aggressive P-state change may be tried.

Whether with a single aggressive change, or with an iterative method, the P-state can be altered until in block 316, it is determined that the collision is resolved.

In block 398, the method is done.

Figure 4:
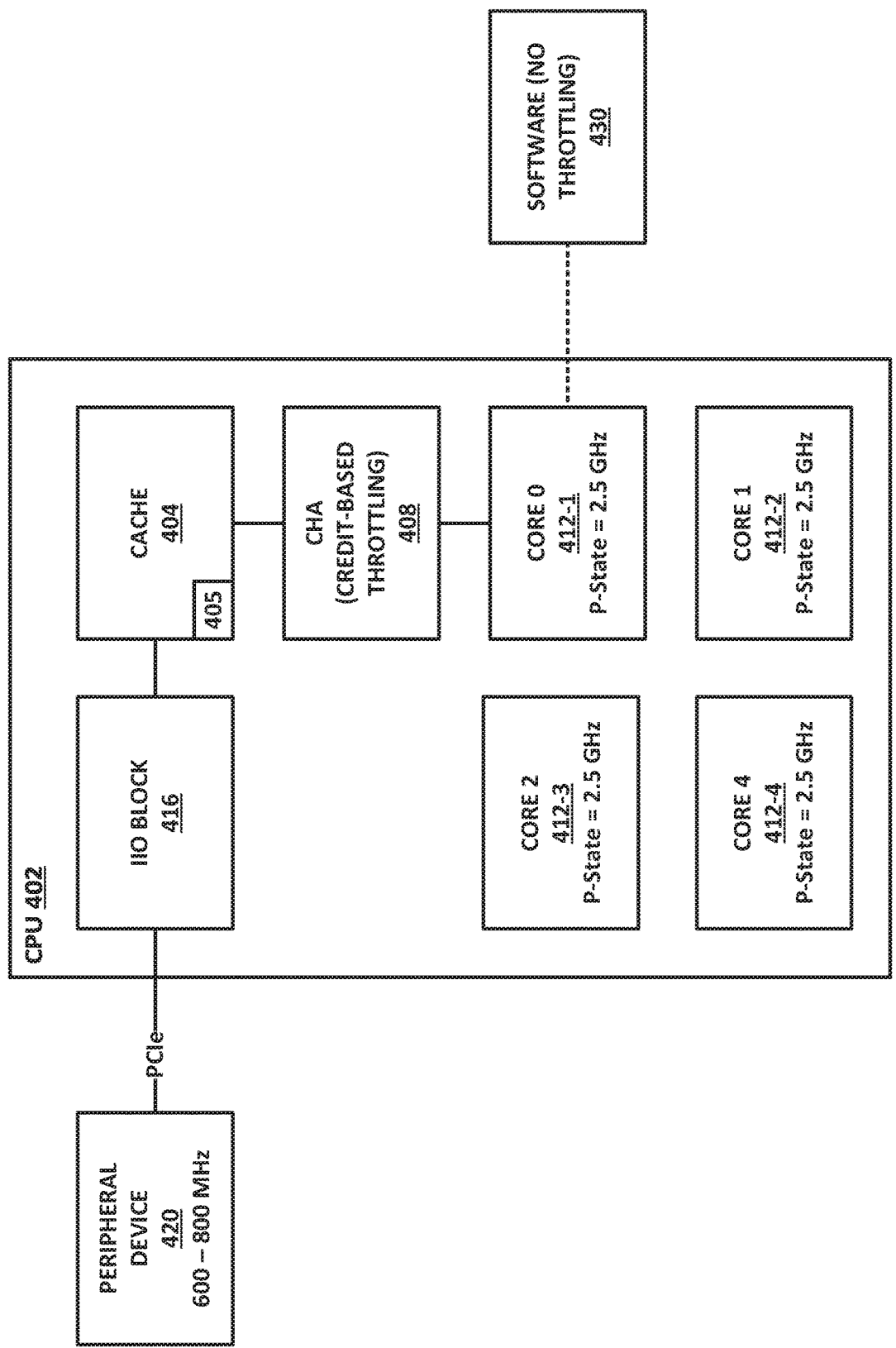
FIG. 4 is a block diagram of a computing system in which a caching home agent (CHA) uses a credit scheme to reduce central processing unit (CPU) contention without software throttling, according to one or more examples of the present specification.

FIG. 4 is a block diagram of a computing system in which a CHA uses a credit scheme to reduce CPU contention without software throttling, according to one or more examples of the present specification.

FIG. 4 illustrates a CPU 402 on which software 430 is operating. Note that in this example, software 430 provides no throttling of core 0 412-1, which is polling address 405 within cache 404 for inputs from peripheral device 420. Peripheral device 420 communicatively couples to IIO block 416 via an interface such as a PCIe link. As before, peripheral device 420 may be, for example, a NIC or other suitable peripheral. When peripheral device 420 receives data, it writes the data to address 405 within core 404. As in previous examples, cores 412 operate at a much faster speed than peripheral device 120. For example, cores 412 may operate at approximately 202.5 GHz, while peripheral device 420 operates at 600 to 800 MHz. Thus, cores 412 operate at least at an order of magnitude greater speed than peripheral device 420. As before, this can cause address 405 to effectively be blocked by core 412-1, so that the core's polling of address 405 becomes a bottleneck for peripheral device 420 to write data to address 405.

Because software 430 provides no throttling, throttling is provided within CPU 402. In this case, rather than IIO block 416 writing a P-state to core 0 412-1, CHA 408 handles the throttling. Core 0 412-1 continues to operate at its ordinary processor speed, such as 2.5 GHz. This can be particularly beneficial in cases where core 0 412-1 is performing more than one task, or in other words where core 0 412-1 is doing something more than just polling address 405 for incoming data. In the case where core 0 412-1 is multitasking, it is less desirable to alter the speed of core 0 412-1 with a P-state as this also slows down the other processes running on core 0 412-1. While core 0 412-1 is not throttled by a P-state, the effective memory access speed may be throttled, for example to 1.4 GHz, or to any desirable speed, such as between 800 MHz and the normal operating speed of the core.

In this embodiment, CHA 408 provides a credit mechanism to core 0 412-1. Credit means for CHA 408 may include logic programmed into CHA 408 to issue credits, including logic to determine how much credit to issue to core 0 412-1. The credits issued to core 0 412-1 should be sufficient to allow core 0 412-1 to effectively poll address 405, while not allowing core 0 412-1 to poll address 405 at such a fast rate that it becomes a bottleneck to peripheral device 420 writing to address 405 via IIO block 416. Additional details of an example implementation of such a CHA are illustrated in FIG. 5.

Figure 5:
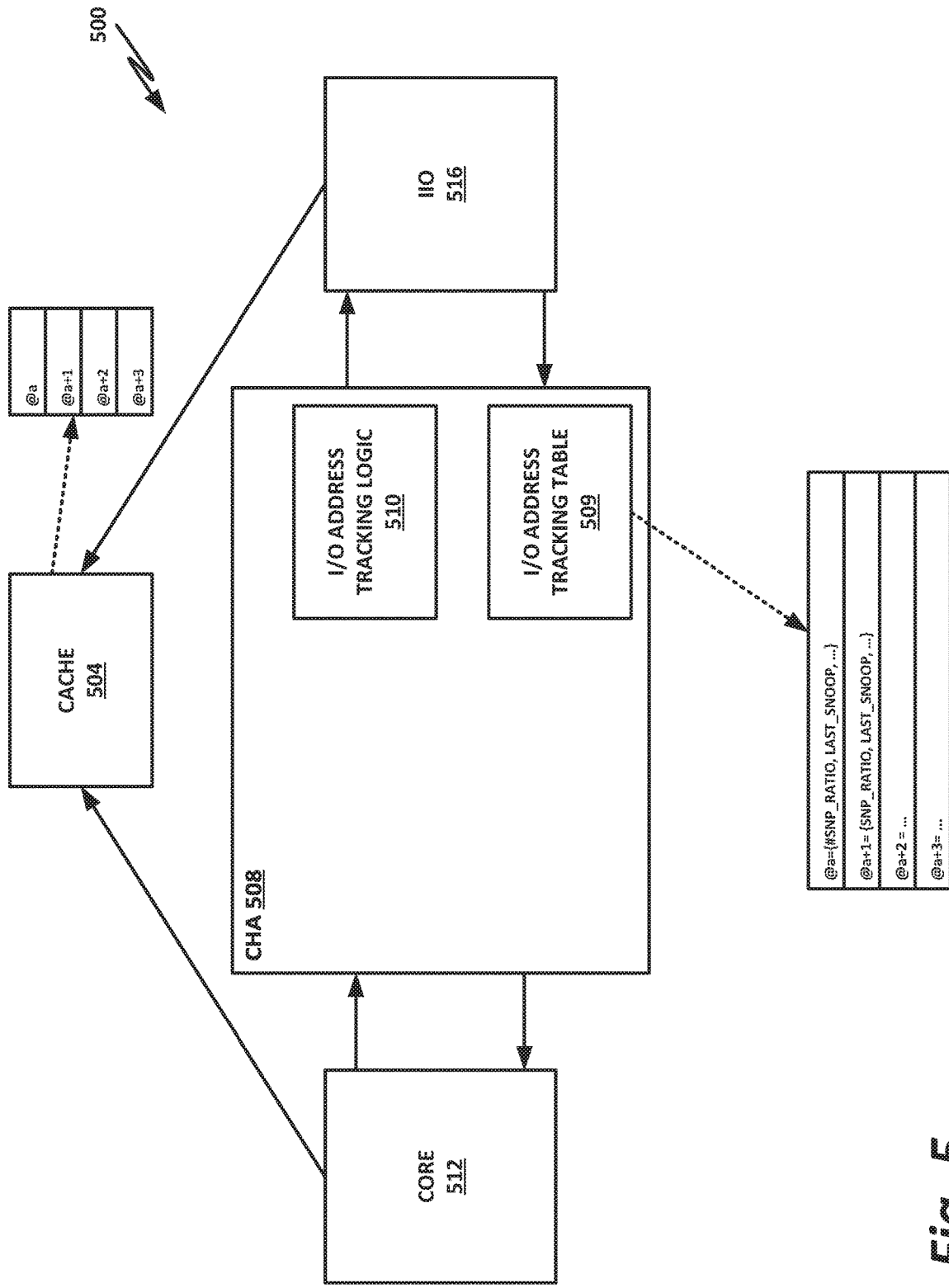
FIG. 5 is a block diagram of a system configured to provide a credit-based throttling mechanism or other credit-based throttling means, according to one or more examples of the present specification.

FIG. 5 is a block diagram of a system 500 configured to provide a credit-based throttling mechanism or other credit-based throttling means, according to one or more examples of the present specification. In the example of FIG. 5, system 500 includes a cache 504, an IIO 516, a core 512, and a CHA 508. As in the previous illustrations, core 512 may access cache 504 (for example via DMA means) at a speed that may be substantially greater than an operating speed of IIO 516.

As in the previous examples, this can create a bottleneck when IIO is trying to populate a memory address within cache 504 with input data from a peripheral connected to system 500 via IIO 516.

In this example, CHA 508 includes I/O address tracking logic 510 and an I/O address tracking table 509. I/O address tracking table 509 may include, for example, fields that represent an SNP ratio, along with an indication of when the last snoop from core 512 was. This can be calculated for a plurality of addresses, such as address, address plus one, address plus two, address plus three, etcetera. I/O address tracking logic 510 can use values in the I/O address tracking table to select an appropriate number of credits to issue to core 512 at any given time. The selected number of credits may be configured, for example, to ensure that core 512 is able to access the address frequently enough to effectively poll the address without unnecessary latency, while also ensuring that the core's polling of the address does not effectively create a bottleneck for the IIO's access of the address. This may be based, for example, on a ratio of snoops to the operating speed of IIO 516.

Figure 6:
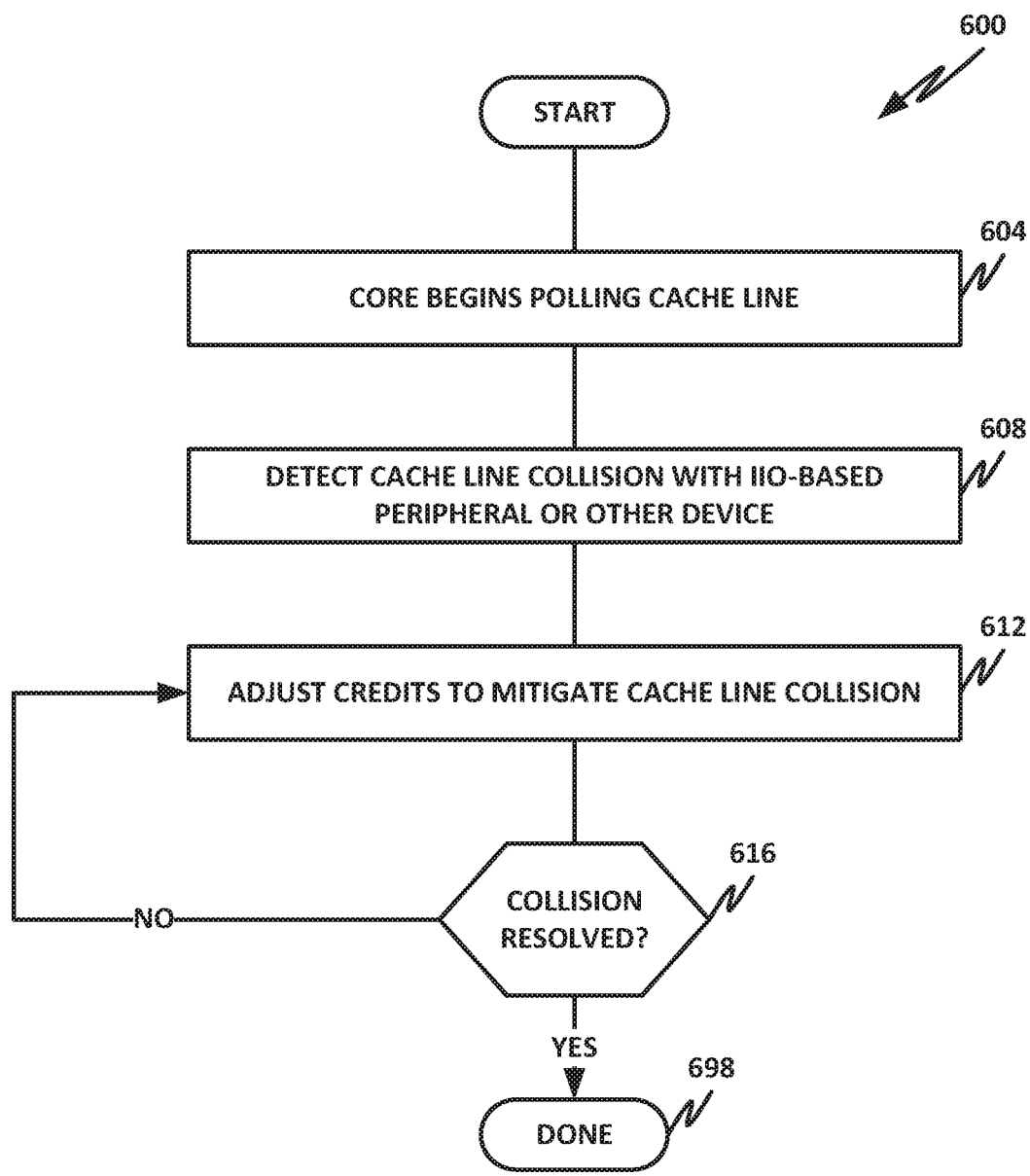
FIG. 6 is a flowchart of a method of providing a credit mechanism for core polling, according to one or more examples of the present specification.

FIG. 6 is a flowchart of a method 600 of providing a credit mechanism for core polling, according to one or more examples of the present specification. Method 600 may be provided, for example, by a CHA in a computing system or computing apparatus, or by other appropriate hardware or software.

In block 604, a core begins polling the cache line.

In block 608, the system may detect that a cache line collision is occurring with an IIO-based peripheral or other device. This may be detected according to any of the means illustrated herein, and can include detecting that a ratio of snoops from the core to an operating speed of the IIO exceeds a given threshold.

In block 612, the system, such as a CHA, adjusts the credit mechanism to mitigate the cache line collision.

In block 616, the system determines whether the cache line collision is resolved.

If the cache line collision is not resolved, then control may return to block 612, and the credit mechanism may be iteratively refined until the collision is resolved.

Returning to block 616, if the collision is resolved, then in block 698, the method is done.

Figure 7:
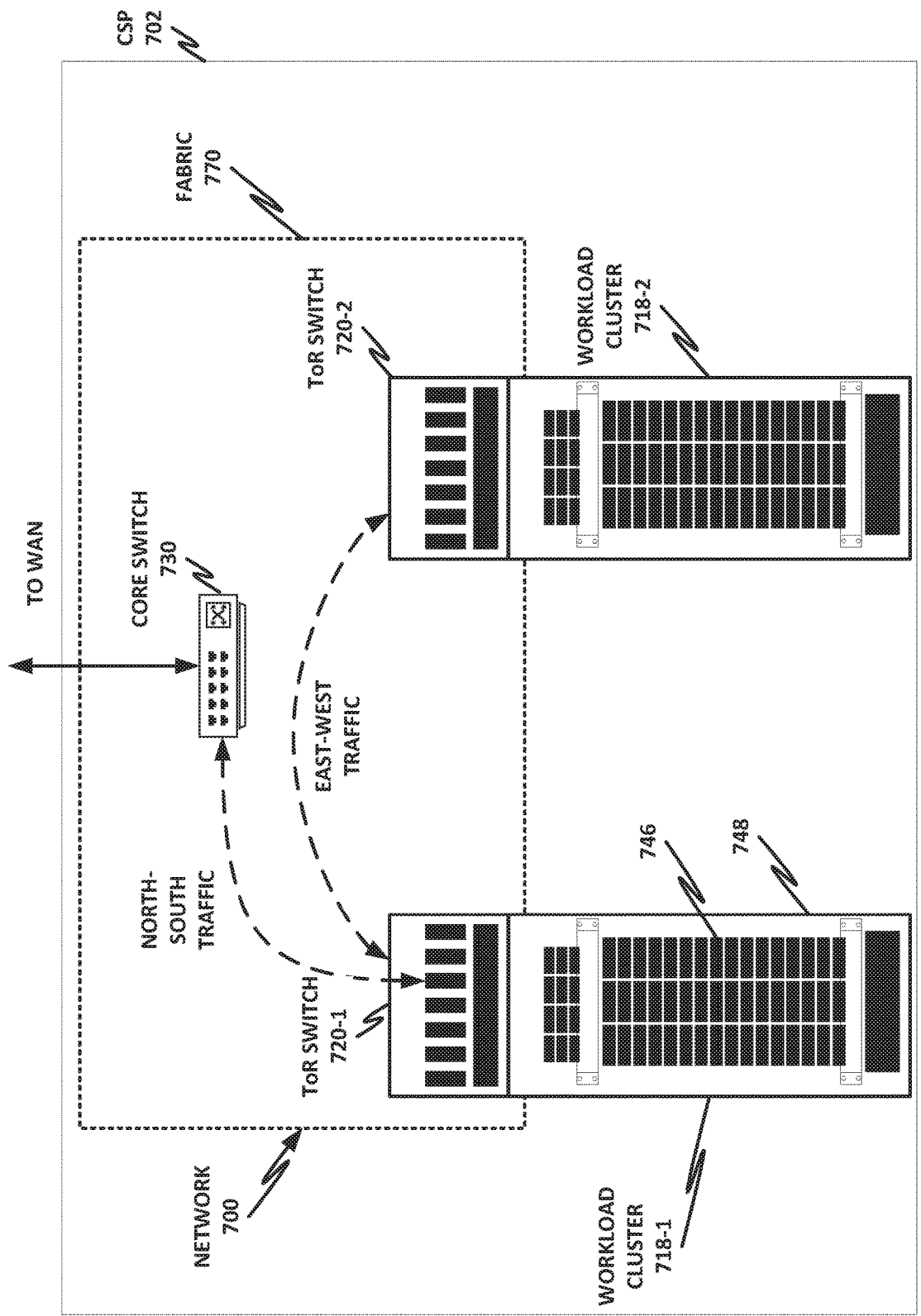
FIG. 7 is a block diagram of selected components of a data center with network connectivity, according to one or more examples of the present specification.

FIG. 7 is a block diagram of selected components of a data center with connectivity to network 700 of a cloud service provider (CSP) 702, according to one or more examples of the present specification. Embodiments of network 700 disclosed herein may be adapted or configured to provide the method of reducing cache line contention according to the teachings of the present specification. CSP 702 may be, by way of nonlimiting example, a traditional enterprise data center, an enterprise "private cloud," or a "public cloud," providing services such as infrastructure as a service (IaaS), platform as a service (PaaS), or software as a service (SaaS). In some cases, CSP 702 may provide, instead of or in addition to cloud services, high-performance computing (HPC) platforms or services. Indeed, while not expressly identical, HPC clusters ("supercomputers") may be structurally similar to cloud data centers, and unless and except where expressly specified, the teachings of this specification may be applied to either.

CSP 702 may provision some number of workload clusters 718, which may be clusters of individual servers, blade servers, rackmount servers, or any other suitable server topology. In this illustrative example, two workload clusters, 718-1 and 718-2 are shown, each providing rackmount servers 746 in a chassis 748.

In this illustration, workload clusters 718 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Each server 746 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 746 may be specifically dedicated to certain enterprise clients or tenants, while others may be shared.

The various devices in a data center may be connected to each other via a switching fabric 770, which may include one or more high speed routing and/or switching devices. Switching fabric 770 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 746 increases, traffic volume may further increase. For example, each server 746 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 770 may be provided. Switching fabric 770 is illustrated in this example as a "flat" network, wherein each server 746 may have a direct connection to a top-of-rack (ToR) switch 720 (e.g., a "star" configuration), and each ToR switch 720 may couple to a core switch 730. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 746 may include an Intel® Host Fabric Interface (HFI), a network interface card (NIC), a host channel adapter (HCA), or other host interface. For simplicity and unity, these may be referred to throughout this specification as a "host fabric interface" (HFI), which should be broadly construed as an interface to communicatively couple the host to the data center fabric. The HFI may couple to one or more host processors via an interconnect or bus, such as PCI, PCIe, or similar. In some cases, this interconnect bus, along with other "local" interconnects (e.g., core-to-core Ultra Path Interconnect) may be considered to be part of fabric 770. In other embodiments, the UPI (or other local coherent interconnect) may be treated as part of the secure domain of the processor complex, and thus not part of the fabric.

The interconnect technology may be provided by a single interconnect or a hybrid interconnect, such as where PCIe provides on-chip communication, 1 Gb or 10 Gb copper Ethernet provides relatively short connections to a ToR switch 720, and optical cabling provides relatively longer connections to core switch 730. Interconnect technologies that may be found in the data center include, by way of nonlimiting example, Intel® Omni-Path™ Architecture (OPA), TrueScale™, Ultra Path Interconnect (UPI) (formerly called QPI or KTI), FibreChannel, Ethernet, Fibre-Channel over Ethernet (FCoE), InfiniBand, PCI, PCIe, or fiber optics, to name just a few. The fabric may be cache- and memory-coherent, cache- and memory-non-coherent, or a hybrid of coherent and non-coherent interconnects. Some interconnects are more popular for certain purposes or functions than others, and selecting an appropriate fabric for the instant application is an exercise of ordinary skill. For example, OPA and Infiniband are commonly used in high-performance computing (HPC) applications, while Ethernet and FibreChannel are more popular in cloud data centers. But these examples are expressly nonlimiting, and as data centers evolve fabric technologies similarly evolve.

Note that while high-end fabrics such as OPA are provided herein by way of illustration, more generally, fabric 770 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies may arise to supplement or replace some of those listed here, and any such future network topologies and technologies can be or form a part of fabric 770.

In certain embodiments, fabric 770 may provide communication services on various "layers," as originally outlined in the Open Systems Interconnection (OSI) seven-layer network model. In contemporary practice, the OSI model is not followed strictly. In general terms, layers 1 and 2 are often called the "Ethernet" layer (though in some data centers or supercomputers, Ethernet may be supplanted or supplemented by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 8:
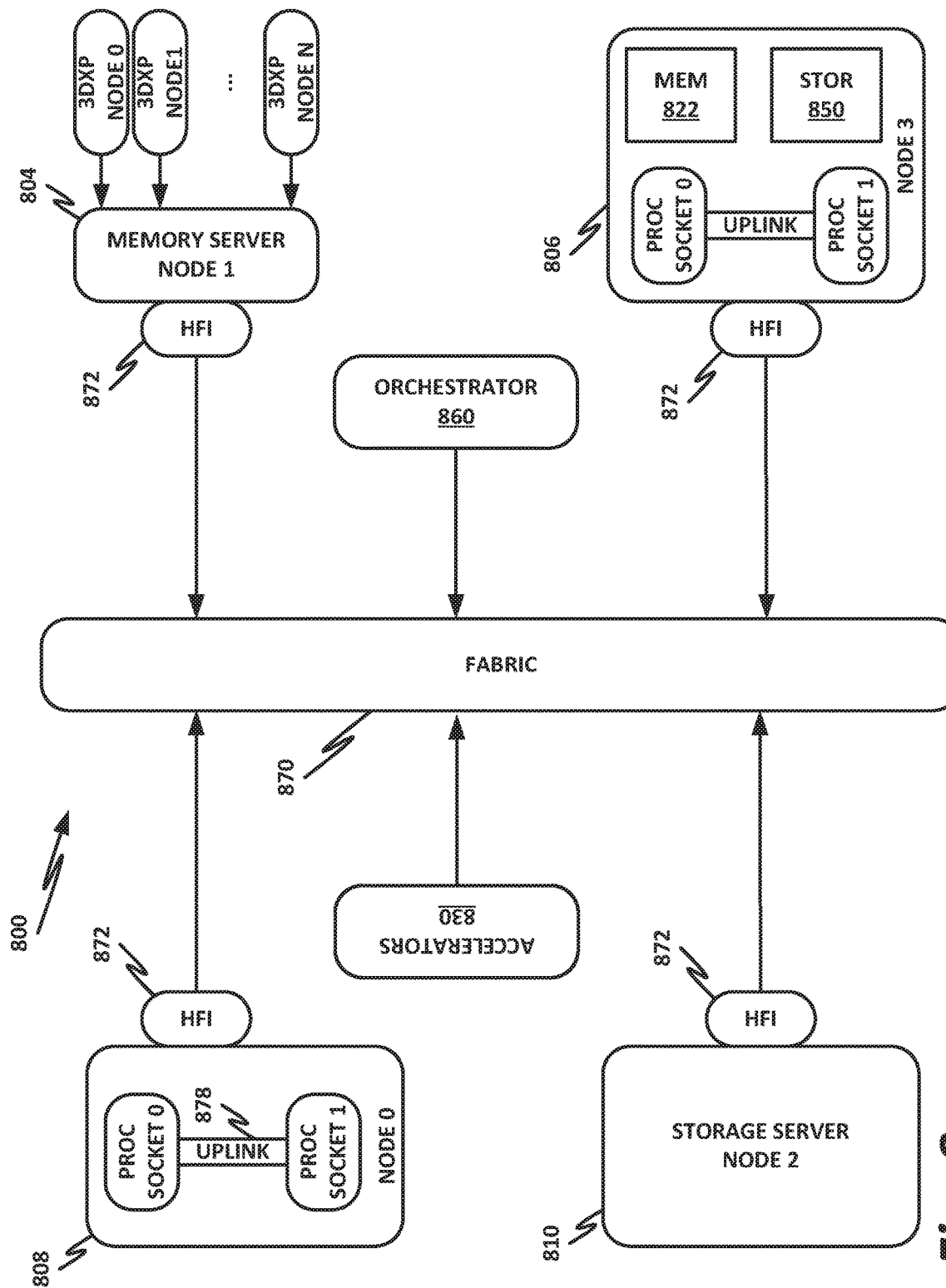
FIG. 8 is a block diagram of selected components of an end-user computing device, according to one or more examples of the present specification.

FIG. 8 is a block diagram of selected components of an end-user computing device 800, according to one or more examples of the present specification. Embodiments of computing device 800 disclosed herein may be adapted or configured to provide the method of reducing cache line contention according to the teachings of the present specification. As above, computing device 800 may provide, as appropriate, cloud service, high-performance computing, telecommunication services, enterprise data center services, or any other compute services that benefit from a computing device 800.

In this example, a fabric 870 is provided to interconnect various aspects of computing device 800. Fabric 870 may be the same as fabric 770 of FIG. 7, or may be a different fabric. As above, fabric 870 may be provided by any suitable interconnect technology. In this example, Intel® Omni-Path™ is used as an illustrative and nonlimiting example.

As illustrated, computing device 800 includes a number of logic elements forming a plurality of nodes. It should be understood that each node may be provided by a physical server, a group of servers, or other hardware. Each server may be running one or more virtual machines as appropriate to its application.

Node 0 808 is a processing node including a processor socket 0 and processor socket 1. The processors may be, for example, Intel® Xeon™ processors with a plurality of cores, such as 4 or 8 cores. Node 0 808 may be configured to provide network or workload functions, such as by hosting a plurality of virtual machines or virtual appliances.

Onboard communication between processor socket 0 and processor socket 1 may be provided by an onboard uplink 878. This may provide a very high speed, short-length interconnect between the two processor sockets, so that virtual machines running on node 0 808 can communicate with one another at very high speeds. To facilitate this communication, a virtual switch (vSwitch) may be provisioned on node 0 808, which may be considered to be part of fabric 870.

Node 0 808 connects to fabric 870 via an HFI 872. HFI 872 may connect to an Intel® Omni-Path™ fabric. In some examples, communication with fabric 870 may be tunneled, such as by providing UPI tunneling over Omni-Path™.

Because computing device 800 may provide many functions in a distributed fashion that in previous generations were provided onboard, a highly capable HFI 872 may be provided. HFI 872 may operate at speeds of multiple gigabits per second, and in some cases may be tightly coupled with node 0 808. For example, in some embodiments, the logic for HFI 872 is integrated directly with the processors on a system-on-a-chip. This provides very high speed communication between HFI 872 and the processor sockets, without the need for intermediary bus devices, which may introduce additional latency into the fabric. However, this is not to imply that embodiments where HFI 872 is provided over a traditional bus are to be excluded. Rather, it is expressly anticipated that in some examples, HFI 872 may be provided on a bus, such as a PCIe bus, which is a serialized version of PCI that provides higher speeds than traditional PCI. Throughout computing device 800, various nodes may provide different types of HFIs 872, such as onboard HFIs and plug-in HFIs. It should also be noted that certain blocks in a system on a chip may be provided as intellectual property (IP) blocks that can be "dropped" into an integrated circuit as a modular unit. Thus, HFI 872 may in some cases be derived from such an IP block.

Note that in "the network is the device" fashion, node 0 808 may provide limited or no onboard memory or storage. Rather, node 0 808 may rely primarily on distributed services, such as a memory server and a networked storage server. Onboard, node 0 808 may provide only sufficient memory and storage to bootstrap the device and get it communicating with fabric 870. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 804 and a node 2 storage server 810 provide the operational memory and storage capabilities of node 0 808. For example, memory server node 1 804 may provide remote direct memory access (RDMA), whereby node 0 808 may access memory resources on node 1 804 via fabric 870 in a direct memory access fashion, similar to how it would access its own onboard memory. The memory provided by memory server 804 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 808, a storage server node 2 810 may be provided. Storage server 810 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 808 may access memory from memory server 804 and store results on storage provided by storage server 810. Each of these devices couples to fabric 870 via a HFI 872, which provides fast communication that makes these technologies possible.

By way of further illustration, node 3 806 is also depicted. Node 3 806 also includes a HFI 872, along with two processor sockets internally connected by an uplink. However, unlike node 0 808, node 3 806 includes its own onboard memory 822 and storage 850. Thus, node 3 806 may be configured to perform its functions primarily onboard, and may not be required to rely upon memory server 804 and storage server 810. However, in appropriate circumstances, node 3 806 may supplement its own onboard memory 822 and storage 850 with distributed resources similar to node 0 808.

Computing device 800 may also include accelerators 830. These may provide various accelerated functions, including hardware or coprocessor acceleration for functions such as packet processing, encryption, decryption, compression, decompression, network security, or other accelerated functions in the data center. In some examples, accelerators 830 may include deep learning accelerators that may be directly attached to one or more cores in nodes such as node 0 808 or node 3 806. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

In other embodiments, an accelerator could also be provided as an ASIC, FPGA, coprocessor, graphics processing unit (GPU), digital signal processor (DSP), or other processing entity, which may optionally be tuned or configured to provide the accelerator function.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 9:
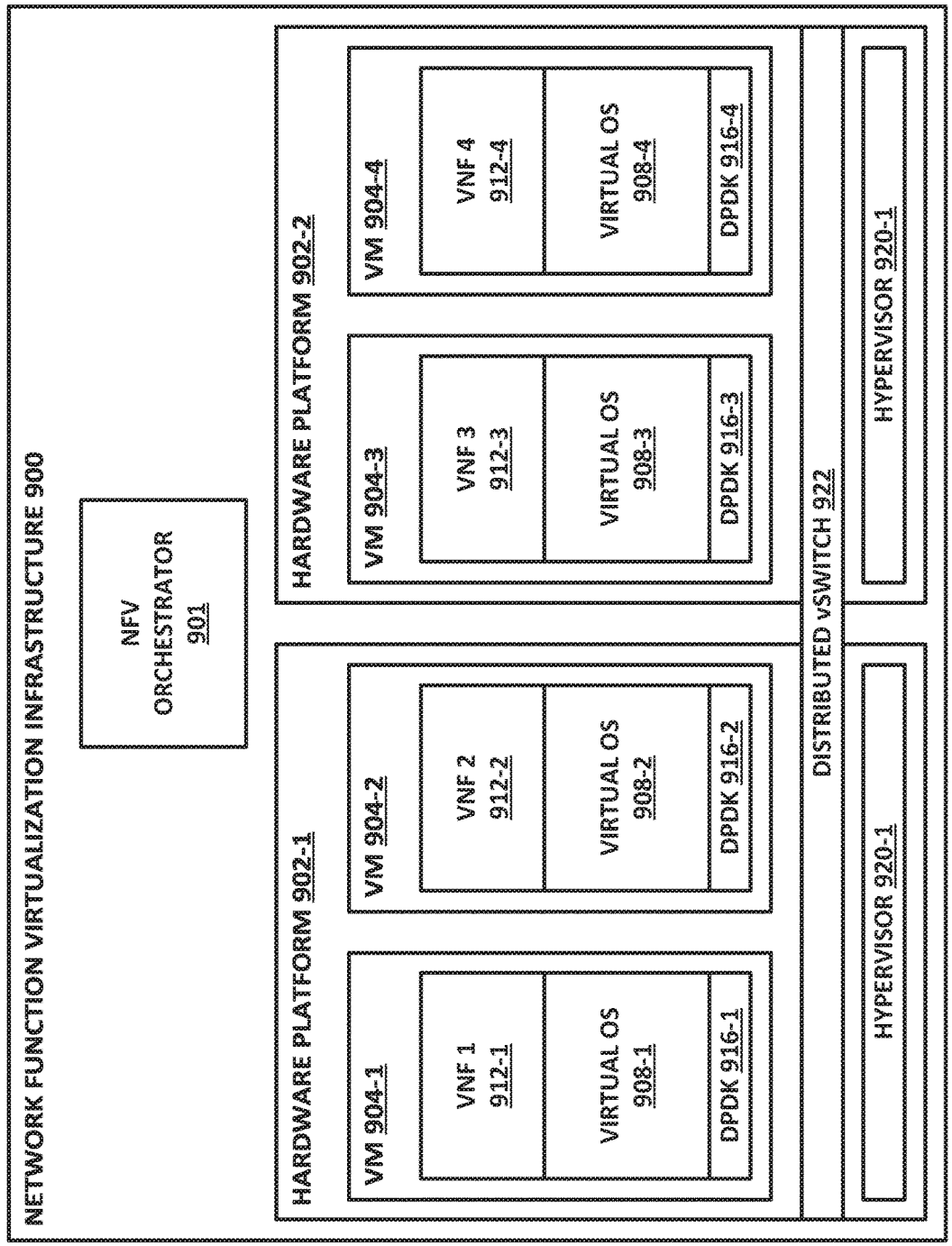
FIG. 9 is a block diagram of a network function virtualization (NFV) architecture, according to one or more examples of the present specification.

FIG. 9 is a block diagram of a network function virtualization (NFV) infrastructure 900 according to one or more examples of the present specification. Embodiments of NFV infrastructure 900 disclosed herein may be adapted or configured to provide the method of reducing cache line contention according to the teachings of the present specification. NFV is an aspect of network virtualization that is generally considered distinct from, but that can still interoperate with SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

Like SDN, NFV is a subset of network virtualization. In other words, certain portions of the network may rely on SDN, while other portions (or the same portions) may rely on NFV.

In the example of FIG. 9, an NFV orchestrator 901 manages a number of the VNFs 912 running on an NFVI 900. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 901 a valuable system resource. Note that NFV orchestrator 901 may provide a browser-based or graphical configuration interface, and in some embodiments may be integrated with SDN orchestration functions.

Note that NFV orchestrator 901 itself may be virtualized (rather than a special-purpose hardware appliance). NFV orchestrator 901 may be integrated within an existing SDN system, wherein an operations support system (OSS) manages the SDN. This may interact with cloud resource management systems (e.g., OpenStack) to provide NFV orchestration. An NFVI 900 may include the hardware, software, and other infrastructure to enable VNFs to run. This may include a hardware platform 902 on which one or more VMs 904 may run. For example, hardware platform 902-1 in this example runs VMs 904-1 and 904-2. Hardware platform 902-2 runs VMs 904-3 and 904-4. Each hardware platform may include a hypervisor 920, virtual machine manager (VMM), or similar function, which may include and run on a native (bare metal) operating system, which may be minimal so as to consume very few resources.

Hardware platforms 902 may be or comprise a rack or several racks of blade or slot servers (including, e.g., processors, memory, and storage), one or more data centers, other hardware resources distributed across one or more geographic locations, hardware switches, or network interfaces. An NFVI 900 may also include the software architecture that enables hypervisors to run and be managed by NFV orchestrator 901.

Running on NFVI 900 are a number of VMs 904, each of which in this example is a VNF providing a virtual service appliance. Each VM 904 in this example includes an instance of the Data Plane Development Kit (DVDK), a virtual operating system 908, and an application providing the VNF 912.

Virtualized network functions could include, as nonlimiting and illustrative examples, firewalls, intrusion detection systems, load balancers, routers, session border controllers, deep packet inspection (DPI) services, network address translation (NAT) modules, or call security association.

The illustration of FIG. 9 shows that a number of VNFs 904 have been provisioned and exist within NFVI 900. This figure does not necessarily illustrate any relationship between the VNFs and the larger network, or the packet flows that NFVI 900 may employ.

The illustrated DPDK instances 916 provide a set of highly-optimized libraries for communicating across a virtual switch (vSwitch) 922. Like VMs 904, vSwitch 922 is provisioned and allocated by a hypervisor 920. The hypervisor uses a network interface to connect the hardware platform to the data center fabric (e.g., an HFI). This HFI may be shared by all VMs 904 running on a hardware platform 902. Thus, a vSwitch may be allocated to switch traffic between VMs 904. The vSwitch may be a pure software vSwitch (e.g., a shared memory vSwitch), which may be optimized so that data are not moved between memory locations, but rather, the data may stay in one place, and pointers may be passed between VMs 904 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 922 is illustrated, wherein vSwitch 922 is shared between two or more physical hardware platforms 902.

Figure 10:
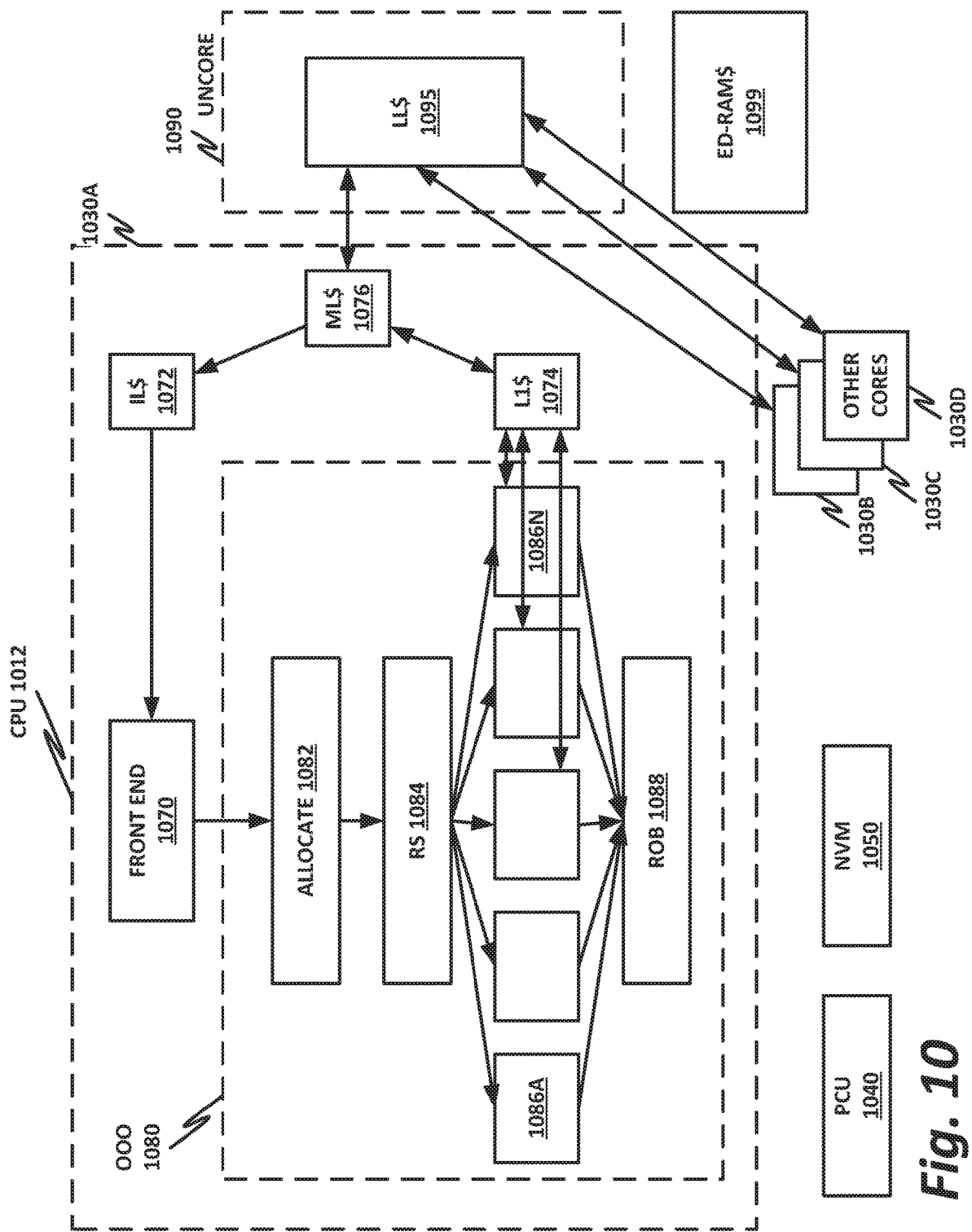
FIG. 10 is a block diagram of a central processing unit (CPU), according to one or more examples of the present specification.

FIG. 10 illustrates a block diagram of a central processing unit (CPU) 1012 in accordance with certain embodiments. Embodiments of CPU 1012 disclosed herein may be adapted or configured to provide the method of reducing cache line contention according to the teachings of the present specification. Although CPU 1012 depicts a particular configuration, the cores and other components of CPU 1012 may be arranged in any suitable manner. CPU 1012 may comprise any processor or processing device, such as a microprocessor, an embedded processor, a digital signal processor (DSP), a network processor, an application processor, a co-processor, a system on a chip (SOC), or other device to execute code. CPU 1012, in the depicted embodiment, includes four processing elements (cores 1030 in the depicted embodiment), which may include asymmetric processing elements or symmetric processing elements. However, CPU 1012 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 1030A includes an out-of-order processor that has a front end unit 1070 used to fetch incoming instructions, perform various processing (e.g. caching, decoding, branch predicting, etc.) and passing instructions/operations along to an out-of-order (OOO) engine. The OOO engine performs further processing on decoded instructions.

A front end 1070 may include a decode module coupled to fetch logic to decode fetched elements. Fetch logic, in one embodiment, includes individual sequencers associated with thread slots of cores 1030. Usually a core 1030 is associated with a first ISA, which defines/specifies instructions executable on core 1030. Often machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 1030, in one embodiment, recognize the same ISA (or a subset thereof). Alternatively, in a heterogeneous core environment, a decoder of one or more cores (e.g., core 1030B) may recognize a second ISA (either a subset of the first ISA or a distinct ISA).

In the embodiment depicted, the out-of-order engine includes an allocate unit 1082 to receive decoded instructions, which may be in the form of one or more micro-instructions or μops, from front end unit 1070, and allocate them to appropriate resources such as registers and so forth. Next, the instructions are provided to a reservation station 1084, which reserves resources and schedules them for execution on one of a plurality of execution units 1086A-1086N. Various types of execution units may be present, including, for example, arithmetic logic units (ALUs), load and store units, vector processing units (VPUs), floating point execution units, among others. Results from these different execution units are provided to a reorder buffer (ROB) 1088, which take unordered results and return them to correct program order.

In the embodiment depicted, both front end unit 1070 and out-of-order engine 1080 are coupled to different levels of a memory hierarchy. Specifically shown is an instruction level cache 1072, that in turn couples to a mid-level cache 1076, that in turn couples to a last level cache 1095. In one embodiment, last level cache 1095 is implemented in an on-chip (sometimes referred to as uncore) unit 1090. Uncore 1090 may communicate with system memory 1099, which, in the illustrated embodiment, is implemented via embedded DRAM (eDRAM). The various execution units 1086 within OOO engine 1080 are in communication with a first level cache 1074 that also is in communication with mid-level cache 1076. Additional cores 1030B-1030D may couple to last level cache 1095 as well.

In particular embodiments, uncore 1090 may be in a voltage domain and/or a frequency domain that is separate from voltage domains and/or frequency domains of the cores. That is, uncore 1090 may be powered by a supply voltage that is different from the supply voltages used to power the cores and/or may operate at a frequency that is different from the operating frequencies of the cores.

CPU 1012 may also include a power control unit (PCU) 1040. In various embodiments, PCU 1040 may control the supply voltages and the operating frequencies applied to each of the cores (on a per-core basis) and to the uncore. PCU 1040 may also instruct a core or uncore to enter an idle state (where no voltage and clock are supplied) when not performing a workload.

In various embodiments, PCU 1040 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 1040 may detect stress characteristics at any suitable interval.

In various embodiments, PCU 1040 is a component that is discrete from the cores 1030. In particular embodiments, PCU 1040 runs at a clock frequency that is different from the clock frequencies used by cores 1030. In some embodiments where the PCU is a microcontroller, PCU 1040 executes instructions according to an ISA that is different from an ISA used by cores 1030.

In various embodiments, CPU 1012 may also include a nonvolatile memory 1050 to store stress information (such as stress characteristics, incremental stress values, accumulated stress values, stress accumulation rates, or other stress information) associated with cores 1030 or uncore 1090, such that when power is lost, the stress information is maintained.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a computing apparatus, comprising: a cache; a caching agent (CA); an integrated input/output (IIO) block to provide a cache coherent interface to a peripheral device at a first speed; a core configured to poll an address within the cache via the CA, wherein the address is to receive incoming data from the peripheral device via the IIO, and wherein the core is capable of polling the address at a second speed substantially greater than the first speed; and a hardware uncore agent configured to: identify a collision between the core and the IIO comprising determining that the core is polling the address at a rate that is determined to interfere with access to the address by the IIO; and throttle the core's access to the address.

Example 2 includes the computing apparatus of example 1, wherein the uncore agent is the IIO.

Example 3 includes the computing apparatus of example 2, wherein throttling the core's access to the address comprises the IIO issuing a P-state transition signal to the core.

Example 4 includes the computing apparatus of example 3, wherein the IIO is configured to select the P-state transition signal such that the core is able to access the address frequently enough to effectively poll the address without unnecessary latency, while ensuring that the core's polling of the address does not effectively create a bottleneck for the IIO's access of the address.

Example 5 includes the computing apparatus of example 3, wherein the computing apparatus comprises a plurality of cores, and wherein the IIO is configured to identify the core configured to poll the address, and to throttle only the core configured to poll the address.

Example 6 includes the computing apparatus of example 1, wherein the uncore agent is the CA.

Example 7 includes the computing apparatus of example 6, wherein the CA is a cache home agent (CHA).

Example 8 includes the computing apparatus of example 6, wherein throttling the core's access to the address comprises credit means.

Example 9 includes the computing apparatus of example 8, wherein the credit means are configured to issue credits to the core such that the core is able to access the address frequently enough to effectively poll the address without unnecessary latency, while ensuring that the core's polling of the address does not effectively create a bottleneck for the IIO's access of the address.

Example 10 includes the computing apparatus of any of examples 1-9, wherein the second speed is approximately three times the first speed.

Example 11 includes the computing apparatus of any of examples 1-9, wherein the hardware uncore agent is configured to iteratively adjust the throttling until the collision is resolved.

Example 12 includes the computing apparatus of any of examples 1-9, wherein the IIO is configured to communicatively couple to the peripheral device via a peripheral component interconnect express (PCIe) bus.

Example 13 includes a hardware uncore agent, configured to: communicatively couple to a cache, the cache comprising an address configured to receive incoming data from a peripheral device via an integrated input/output (IIO) and also accessible by a core configured to poll the address via a caching agent (CA); identify a collision between the core and the IIO comprising determining that the core is polling the address at a rate that is determined to interfere with access to the address by the IIO; and throttle the core's access to the address.

Example 14 includes the hardware uncore agent of example 13, wherein the hardware uncore agent is the IIO.

Example 15 includes the hardware uncore agent of example 14, wherein throttling the core's access to the address comprises the IIO issuing a P-state transition signal to the core.

Example 16 includes the hardware uncore agent of example 15, wherein the IIO is configured to select the P-state transition signal such that the core is able to access the address frequently enough to effectively poll the address without unnecessary latency, while ensuring that the core's polling of the address does not effectively create a bottleneck for the IIOs access of the address.

Example 17 includes the hardware uncore agent of example 15, wherein the IIO is configured to identify the core configured to poll the address from among a plurality of cores, and to throttle only the core configured to poll the address.

Example 18 includes the hardware uncore agent of example 13, wherein the uncore agent is the CA.

Example 19 includes the hardware uncore agent of example 18, wherein the CA is a cache home agent (CHA).

Example 20 includes the hardware uncore agent of example 18, wherein throttling the core's access to the address comprises credit means.

Example 21 includes the hardware uncore agent of example 20, wherein the credit means are configured to issue credits to the core such that the core is able to access the address frequently enough to effectively poll the address without unnecessary latency, while ensuring that the core's polling of the address does not effectively create a bottleneck for the IIO's access of the address.

Example 22 includes the hardware uncore agent of any of examples 13-21, wherein the second speed is approximately three times the first speed.

Example 23 includes the hardware uncore agent of any of examples 13-21, wherein the hardware uncore agent is configured to iteratively adjust the throttling until the collision is resolved.

Example 24 includes the hardware uncore agent of any of examples 13-21, wherein the IIO is configured to communicatively couple to the peripheral device via a peripheral component interconnect express (PCIe) bus.

Example 25 includes an intellectual property (IP) block comprising the hardware uncore agent of any of examples 13-24.

Example 26 includes a system-on-a-chip (SoC) comprising the hardware uncore agent of any of examples 13-24.

Example 27 includes an application-specific integrated circuit (ASIC) comprising the hardware uncore agent of any of examples 13-24.

Example 28 includes a field-programmable gate array (FPGA) configured to provide the hardware uncore agent of any of examples 13-24.

Example 29 includes one or more tangible, non-transitory computer-readable mediums having stored thereon instructions to configure a hardware device to provide the hardware uncore agent of any of examples 13-24.

Example 30 includes a hardware integrated input/output (IIO), configured to: communicatively couple to a cache, the cache comprising an address configured to receive incoming data from a peripheral device via the IIO and also accessible by a core configured to poll the address via a caching agent (CA); identify a collision between the core and the IIO comprising determining that the core is polling the address at a rate that is determined to interfere with access to the address by the IIO; and throttle the core's access to the address.

Example 31 includes the hardware IIO of example 30, wherein throttling the core's access to the address comprises the IIO issuing a P-state transition signal to the core.

Example 32 includes the hardware IIO of example 31, wherein the IIO is configured to select the P-state transition signal such that the core is able to access the address frequently enough to effectively poll the address without unnecessary latency, while ensuring that the core's polling of the address does not effectively create a bottleneck for the IIO's access of the address.

Example 33 includes the hardware IIO of example 31, wherein the IIO is configured to identify the core configured to poll the address from among a plurality of cores, and to throttle only the core configured to poll the address.

Example 34 includes the hardware IIO of any of examples 30-33, wherein the second speed is approximately three times the first speed.

Example 35 includes the hardware IIO of any of examples 30-33, wherein the hardware IIO agent is configured to iteratively adjust the P-state until the collision is resolved.

Example 36 includes the hardware IIO of any of examples 30-33, wherein the hardware IIO is configured to communicatively couple to the peripheral device via a peripheral component interconnect express (PCIe) bus.

Example 37 includes an intellectual property (IP) block comprising the hardware IIO of any of examples 30-36.

Example 38 includes a system-on-a-chip (SoC) comprising the hardware IIO of any of examples 30-36.

Example 39 includes an application-specific integrated circuit (ASIC) comprising the hardware IIO any of examples 30-36.

Example 40 includes a field-programmable gate array (FPGA) configured to provide the hardware IIO any of examples 30-36.

Example 41 includes one or more tangible, non-transitory computer-readable mediums having stored thereon instructions to configure a hardware device to provide the hardware IIO any of examples 30-36.

Example 42 includes a caching agent, configured to: communicatively couple to a cache, the cache comprising an address configured to receive incoming data from a peripheral device via an integrated input/output (IIO) and also accessible by a core configured to poll the address via the CA; identify a collision between the core and the IIO comprising determining that the core is polling the address at a rate that is determined to interfere with access to the address by the IIO; and throttle the core's access to the address.

Example 43 includes the caching agent of example 42, wherein the CA is a cache home agent (CHA).

Example 44 includes the caching agent of example 42, wherein throttling the core's access to the address comprises credit means.

Example 45 includes the caching agent of example 44, wherein the credit means are configured to issue credits to the core such that the core is able to access the address frequently enough to effectively poll the address without unnecessary latency, while ensuring that the core's polling of the address does not effectively create a bottleneck for the IIOs access of the address.

Example 46 includes the caching agent of any of examples 42-45, wherein the second speed is approximately three times the first speed.

Example 47 includes the caching agent of any of examples 42-45, wherein the caching agent is further configured to iteratively adjust the credit means until the collision is resolved.

Example 48 includes the caching agent of any of examples 42-45, wherein the IIO is configured to communicatively couple to the peripheral device via a peripheral component interconnect express (PCIe) bus.

Example 49 includes an intellectual property (IP) block comprising the CA of any of examples 42-48.

Example 50 includes a system-on-a-chip (SoC) comprising the CA of any of examples 42-48.

Example 51 includes an application-specific integrated circuit (ASIC) comprising the CA of any of examples 42-48.

Example 52 includes a field-programmable gate array (FPGA) configured to provide the CA of any of examples 42-48.

Example 53 includes one or more tangible, non-transitory computer-readable mediums having stored thereon instructions to configure a hardware device to provide the CA of any of examples 42-48.

Example 54 includes a method to be performed by a hardware uncore agent, comprising: communicatively coupling to a cache, the cache comprising an address configured to receive incoming data from a peripheral device via an integrated input/output (IIO) and also accessible by a core configured to poll the address via a caching agent (CA); identifying a collision between the core and the IIO comprising determining that the core is polling the address at a rate that is determined to interfere with access to the address by the IIO; and throttling the core's access to the address.

Example 55 includes the method of example 54, wherein the hardware uncore agent is the IIO.

Example 56 includes the method of example 55, wherein throttling the core's access to the address comprises the IIO issuing a P-state transition signal to the core.

Example 57 includes the method of example 56, further comprising selecting the P-state transition signal such that the core is able to access the address frequently enough to effectively poll the address without unnecessary latency, while ensuring that the core's polling of the address does not effectively create a bottleneck for the IIO's access of the address.

Example 58 includes the method of example 56, further comprising identifying the core configured to poll the address from among a plurality of cores, and to throttle only the core configured to poll the address.

Example 59 includes the method of example 54, wherein the uncore agent is the CA.

Example 60 includes the method of example 59, wherein the CA is a cache home agent (CHA).

Example 61 includes the method of example 59, wherein throttling the core's access to the address comprises operating credit means.

Example 62 includes the method of example 61, wherein operating the credit means comprises issuing credits to the core such that the core is able to access the address frequently enough to effectively poll the address without unnecessary latency, while ensuring that the core's polling of the address does not effectively create a bottleneck for the IIO's access of the address.

Example 63 includes the method of any of examples 54-62, wherein the second speed is approximately three times the first speed.

Example 64 includes the method of any of examples 54-62, further comprising iteratively adjusting the throttling until the collision is resolved.

Example 65 includes the method of any of examples 54-64, wherein the IIO is configured to communicatively couple to the peripheral device via a peripheral component interconnect express (PCIe) bus.

Example 66 includes an intellectual property (IP) block configured to perform the method of any of examples 54-64.

Example 67 includes a system-on-a-chip (SoC) configured to perform the method of any of examples 54-64.

Example 68 includes an application-specific integrated circuit (ASIC) configured to perform the method of any of examples 54-64.

Example 69 includes a field-programmable gate array (FPGA) configured to perform the method of any of examples 54-64.

Example 70 includes one or more tangible, non-transitory computer-readable mediums having stored thereon instructions to configure a hardware device to provide the method of any of examples 54-64.

What is claimed is:

1. A computing apparatus, comprising:
   a cache;
   a caching agent (CA);
   an integrated input/output (IIO) block to provide a cache coherent interface to a peripheral device at a first speed;
   a core configured to poll an address within the cache via the CA, wherein the address is to receive incoming data from the peripheral device via the IIO, and wherein the core is capable of polling the address at a second speed substantially greater than the first speed; and
   a hardware uncore agent configured to:
      identify a collision between the core and the peripheral device comprising determining that the core is polling the address at a rate that is determined to interfere with access to the address by the IIO; and
      throttle the core's access to the address.

2. The computing apparatus of claim 1, wherein the uncore agent is the IIO.

3. The computing apparatus of claim 2, wherein throttling the core's access to the address comprises the IIO issuing a P-state transition signal to the core.

4. The computing apparatus of claim 3, wherein the IIO is configured to issue the P-state transition signal such that the core is able to access the address frequently enough to effectively poll the address without unnecessary latency, while ensuring that the core's polling of the address does not effectively create a bottleneck for the IIO's access of the address.

5. The computing apparatus of claim 3, wherein the computing apparatus comprises a plurality of cores, and wherein the IIO is configured to identify the core configured to poll the address, and to throttle only the core configured to poll the address.

6. The computing apparatus of claim 1, wherein the uncore agent is the CA.

7. The computing apparatus of claim 6, wherein the CA is a cache home agent (CHA).

8. The computing apparatus of claim 6, wherein throttling the core's access to the address comprises credit means.

9. The computing apparatus of claim 8, wherein the credit means are configured to issue credits to the core such that the core is able to access the address frequently enough to effectively poll the address without unnecessary latency, while ensuring that the core's polling of the address does not effectively create a bottleneck for the IIO's access of the address.

10. The computing apparatus of claim 1, wherein the second speed is approximately three times the first speed.

11. The computing apparatus of claim 1, wherein the hardware uncore agent is configured to iteratively adjust the throttling until the collision is resolved.

12. The computing apparatus of claim 1, wherein the IIO is configured to communicatively couple to the peripheral device via a peripheral component interconnect express (PCIe) bus.

13. A hardware uncore agent, configured to:
   communicatively couple to a cache, the cache comprising an address configured to receive incoming data from a peripheral device via an integrated input/output (IIO) and also accessible by a core configured to poll the address via a caching agent (CA);
   identify a collision between the core and the peripheral device comprising determining that the core is polling the address at a rate that is determined to interfere with access to the address by the IIO; and
   throttle the core's access to the address.

14. The hardware uncore agent of claim 13, wherein the hardware uncore agent is the IIO.

15. The hardware uncore agent of claim 14, wherein throttling the core's access to the address comprises the IIO issuing a P-state transition signal to the core.

16. The hardware uncore agent of claim 15, wherein the IIO is configured to issue the P-state transition signal such that the core is able to access the address frequently enough to effectively poll the address without unnecessary latency, while ensuring that the core's polling of the address does not effectively create a bottleneck for the IIOs access of the address.

17. The hardware uncore agent of claim 15, wherein the IIO is configured to identify the core configured to poll the address from among a plurality of cores, and to throttle only the core configured to poll the address.

18. The hardware uncore agent of claim 13, wherein the uncore agent is the CA.

19. The hardware uncore agent of claim 18, wherein the CA is a cache home agent (CHA).

20. The hardware uncore agent of claim 18, wherein throttling the core's access to the address comprises credit means.

21. The hardware uncore agent of claim 20, wherein the credit means are configured to issue credits to the core such that the core is able to access the address frequently enough to effectively poll the address without unnecessary latency, while ensuring that the core's polling of the address does not effectively create a bottleneck for the IIO's access of the address.

22. The hardware uncore agent of claim 13, wherein the second speed is approximately three times the first speed.

23. The hardware uncore agent of claim 13, wherein the hardware uncore agent is configured to iteratively adjust the throttling until the collision is resolved.

24. A method to be performed by a hardware uncore agent, comprising:
   communicatively coupling to a cache, the cache comprising an address configured to receive incoming data from a peripheral device via an integrated input/output (IIO) and also accessible by a core configured to poll the address via a caching agent (CA);
   identifying a collision between the core and the peripheral device comprising determining that the core is polling the address at a rate that is determined to interfere with access to the address by the IIO; and
   throttling the core's access to the address.

25. The method of claim 24, wherein the hardware uncore agent is the IIO.

* * * * *